(12) United States Patent
Sekine et al.

(10) Patent No.: US 9,132,848 B2
(45) Date of Patent: Sep. 15, 2015

(54) CONVEYANCE CART

(71) Applicant: KAYABA INDUSTRY CO., LTD., Minato-ku, Tokyo (JP)

(72) Inventors: Shinichi Sekine, Fukaya (JP); Osamu Miyatani, Kani (JP)

(73) Assignee: KAYABA INDUSTRY CO., LTD., Tokyo (JP)

( * ) Notice: Subject to any disclaimer, the term of this patent is extended or adjusted under 35 U.S.C. 154(b) by 0 days.

(21) Appl. No.: 14/350,495

(22) PCT Filed: Oct. 3, 2012

(86) PCT No.: PCT/JP2012/075728
§ 371 (c)(1),
(2) Date: Apr. 8, 2014

(87) PCT Pub. No.: WO2013/054723
PCT Pub. Date: Apr. 18, 2013

(65) Prior Publication Data
US 2014/0265254 A1    Sep. 18, 2014

(30) Foreign Application Priority Data
Oct. 13, 2011    (JP) .................................. 2011-225977

(51) Int. Cl.
*B63B 3/02* (2006.01)
*B62B 5/00* (2006.01)
(Continued)

(52) U.S. Cl.
CPC . *B62B 5/00* (2013.01); *B60L 1/003* (2013.01); *B60L 11/1803* (2013.01); *B60L 11/1877* (2013.01); *B60L 15/20* (2013.01); *B62B 3/02* (2013.01); *B66F 9/065* (2013.01); *B66F 9/07586* (2013.01); *B66F 9/22* (2013.01); *B60L 2200/30* (2013.01); *B60L 2240/423* (2013.01); *B60L 2250/16* (2013.01); *B60L 2270/145* (2013.01); *B62B 3/04* (2013.01); *B62B 2203/10* (2013.01); *Y02T 10/642* (2013.01);
(Continued)

(58) Field of Classification Search
USPC ........................................ 280/79.11; 182/148
See application file for complete search history.

(56) References Cited

U.S. PATENT DOCUMENTS 3,110,476 A * 11/1963 Farris ............................ 254/122
3,237,921 A *  3/1966 Jay ................................ 254/122
(Continued)

FOREIGN PATENT DOCUMENTS

JP    3-223059 A    10/1991
JP    7-69600 A     3/1995
(Continued)

OTHER PUBLICATIONS

International Search Report mailed Dec. 18, 2012, in corresponding International Application No. PCT/JP2012/075728.

*Primary Examiner* — Jeffrey J Restifo
(74) *Attorney, Agent, or Firm* — Lowe Hauptman & Ham, LLP

(57) ABSTRACT

A conveyance cart that can convey a loaded burden, includes: a body frame supported by a wheel; a deck provided liftably against the body frame to load a burden; an electric actuator electrically driven to expand or contract to lift or lower the deck; and a controller that is configured to supply an electric current to the electric actuator. The controller stops supply of an electric current to the electric actuator when a continuous driving time of the electric actuator is equal to or longer than a predetermined time.

4 Claims, 5 Drawing Sheets

(51) Int. Cl.
*B66F 9/075* (2006.01)
*B66F 9/22* (2006.01)
*B66F 9/065* (2006.01)
*B60L 1/00* (2006.01)
*B60L 11/18* (2006.01)
*B60L 15/20* (2006.01)
*B62B 3/02* (2006.01)
*B62B 3/04* (2006.01)

(52) U.S. Cl.
CPC ............ *Y02T10/7005* (2013.01); *Y02T 10/705* (2013.01); *Y02T 10/7275* (2013.01)

(56) References Cited

U.S. PATENT DOCUMENTS

| | | | | |
|---|---|---|---|---|
| 4,249,749 A | * | 2/1981 | Collier | 280/35 |
| 4,558,847 A | * | 12/1985 | Coates | 254/9 C |
| 4,577,821 A | * | 3/1986 | Edmo et al. | 108/145 |
| 4,655,466 A | * | 4/1987 | Hanaoka | 280/47.371 |
| 5,499,694 A | * | 3/1996 | Dorn | 187/200 |
| 5,829,948 A | * | 11/1998 | Becklund | 414/607 |
| 6,050,365 A | * | 4/2000 | Newlin | 182/69.5 |
| 6,065,565 A | * | 5/2000 | Puszkiewicz et al. | 182/2.9 |
| 6,286,812 B1 | * | 9/2001 | Cherry | 254/9 C |
| 6,431,319 B1 | * | 8/2002 | Myers et al. | 187/243 |
| 6,857,493 B2 | * | 2/2005 | Shupp et al. | 180/168 |
| 7,070,167 B1 | * | 7/2006 | Bacon et al. | 254/93 HP |
| 7,070,189 B2 | * | 7/2006 | Grauss | 280/32.6 |
| 8,052,120 B2 | * | 11/2011 | Bacon | 254/93 HP |
| 8,424,883 B1 | * | 4/2013 | Ramos | 280/35 |
| 8,863,899 B2 | * | 10/2014 | Solhjem et al. | 182/69.6 |
| 2014/0265254 A1 | * | 9/2014 | Sekine et al. | 280/638 |

FOREIGN PATENT DOCUMENTS

| | | |
|---|---|---|
| JP | 2000-128005 A | 5/2000 |
| JP | 2002-96905 A | 4/2002 |
| JP | 2002-167177 A | 6/2002 |
| JP | 2004-35239 A | 2/2004 |

* cited by examiner

CONVEYANCE CART

RELATED APPLICATIONS

The present application is a National Phase of International Application Number PCT/JP2012/075728, filed Oct. 3, 2012, which claims priority to Japanese Application Number 2011-225977, filed Oct. 13, 2011.

TECHNICAL FIELD

This invention relates to a conveyance cart that can convey a loaded burden.

BACKGROUND ART

In general, in order to convey a heavy burden in a factory or the like, a conveyance cart that can move in a loaded state is employed.

In JP 2004-35239 A, there is disclosed a movable lift unit that can lift a product loaded on a liftable deck up to a predetermined height. In this lift unit, the liftable deck is lifted or lowered by driving a motor.

SUMMARY OF INVENTION

However, in some cases, the lift unit disclosed in JP 2004-35239 A may remain in a non-working state without being lifted even when the motor is driven in order to lift the liftable deck while a burden having a weight over a maximum payload is loaded. For this reason, the motor may suffer from an overload state, and reliability of the lift unit may be degraded.

It is therefore an object of this invention to improve reliability of the lift unit of the conveyance cart.

According to one aspect of this invention, a conveyance cart that can convey a loaded burden, includes: a body frame supported by a wheel; a deck provided liftably against the body frame to load a burden; an electric actuator electrically driven to expand or contract to lift or lower the deck; and a controller that is configured to supply an electric current to the electric actuator. The controller stops supply of an electric current to the electric actuator when a continuous driving time of the electric actuator is equal to or longer than a predetermined time.

The details as well as other features and advantages of this invention are set forth in the remainder of the specification and are shown in the accompanying drawings.

DESCRIPTION OF EMBODIMENTS

Figure 1:
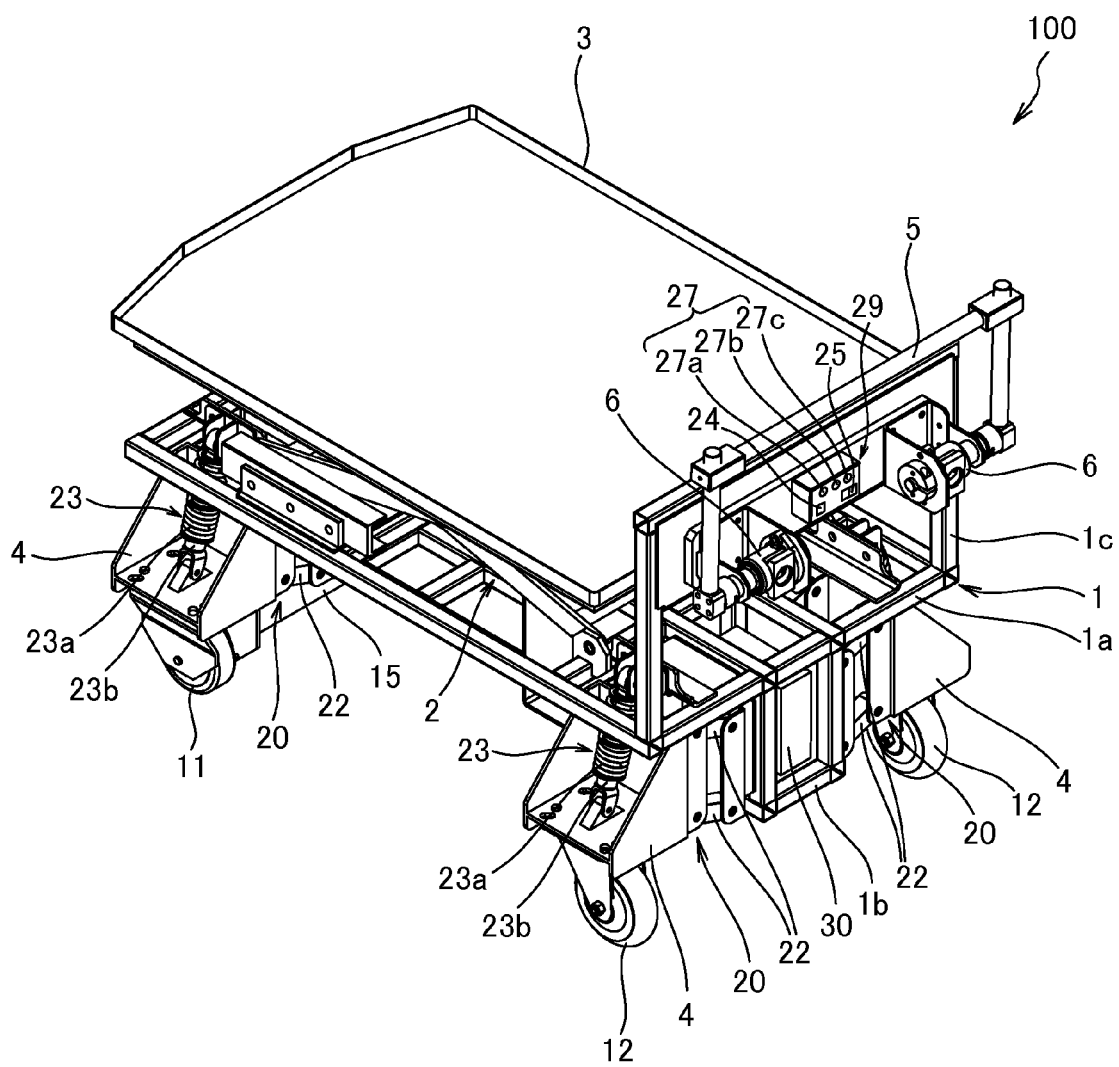
FIG. 1 is a perspective view illustrating a conveyance cart according to an embodiment of the invention.

Hereinafter, an embodiment of the present invention will be described with reference to the accompanying drawings.

First, a conveyance cart 100 according to an embodiment of the invention will be described with reference to FIGS. 1 to 4.

The conveyance cart 100 is used to carry a loaded burden, for example, in a factory or the like. The conveyance cart 100 travels by virtue of an assisting force caused by rotation of an electric motor 15 described below in addition to a driving force applied from an operator. Although the conveyance cart 100 is described as a conveyance cart having an electric assist function herein, a typical cart having no electric assist function may also be employed.

The conveyance cart 100 includes a body frame 1, a deck 3 provided liftably against the body frame 1 to load a burden, a control handle 5 as a handling portion by which a driving force can be input from both left and right portions of the body frame 1, a pair of drive wheels 11 provided in both left and right sides of the body frame 1 with an interval, and a pair of universal wheels 12 installed in the body frame 1 in rear of the drive wheels 11. The drive wheels 11 are front wheels of the conveyance cart 100, and the universal wheels 12 are rear wheels of the conveyance cart 100. The drive wheels 11 and the universal wheels 12 serve as cart wheels.

The body frame 1 is a frame obtained by combining rectangular pipes. The body frame 1 is supported by the drive wheels 11 and the universal wheels 12. The body frame 1 includes a planar portion 1a where a burden is loaded using a deck 3, a lower projecting portion 1b projecting in the lower side of the planar portion 1a, and an erected portion 1c erected on the upper portion of the rear end of the planar portion 1a.

The deck 3 is a rimmed flat plate provided to cover the top of the planar portion 1a of the body frame 1. A burden is directly loaded on the deck 3. The deck 3 may be an unrimmed flat plate. In addition, instead of the deck 3, a roller conveyor may be installed on the body frame 1, and a burden may be loaded using the roller conveyor.

Figure 2:
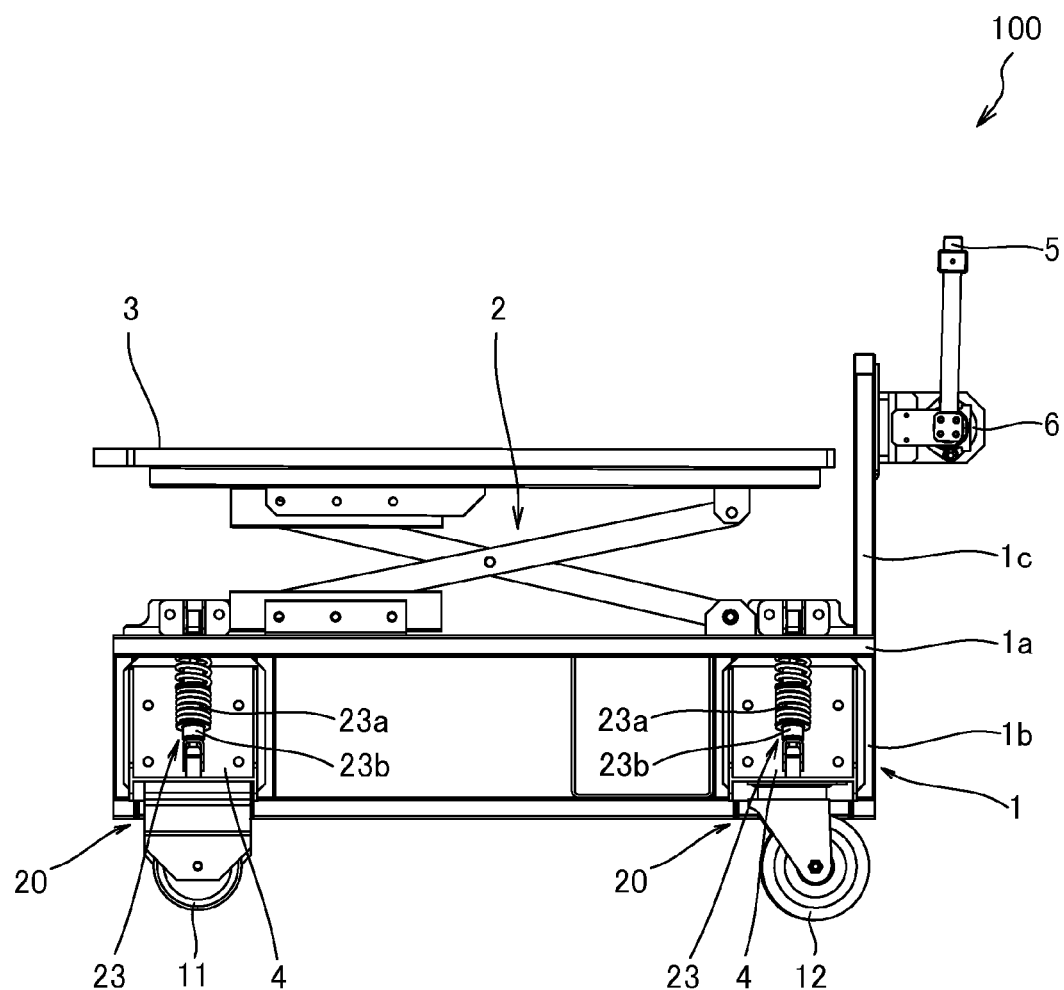
FIG. 2 is a side view of FIG. 1.

As illustrated in FIG. 2, a lift unit 2 is provided between the body frame 1 and the deck 3. The lift unit 2 has an electric lift cylinder 2a (refer to FIG. 4) as an electric actuator that expands or contracts using electric power to lift or lower the deck 3. The lift unit 2 lifts or lowers the deck 3 against the body frame 1 by causing the electric lift cylinder 2a to expand or contract. For example, when a heavy burden is loaded on the deck 3, and the body frame 1 sinks to the drive wheel 11 and the universal wheel 12 by means of a suspension unit 20 described below, the lift unit 2 may lift the deck 3 to constantly maintain a height of the deck 3 from the road surface.

The electric lift cylinder 2a is electrically connected to a controller 30 described below and expands or contracts by the electric current supplied based on an instruction signal from the controller 30. The magnitude of the electric current supplied to the electric lift cylinder 2a can be detected by the controller 30.

The electric lift cylinder 2a is an electric hydraulic linear actuator provided with a hydraulic pump driven by a motor so as to expand or contract by a pressure of the hydraulic fluid discharged from the hydraulic pump. Instead of the electric lift cylinder 2a, other types of electric actuators such as a ball screw type or a linear motor type may also be employed.

The control handle 5 is a reversed U-shaped handle pushed and handled by an operator as illustrated in FIG. 1. Both left and right ends of the control handle 5 are connected to the erected portion 1c of the body frame 1. As a result, a driving force input when an operator handles the control handle 5 is transmitted to the body frame 1.

The drive wheel 11 is a small wheel unturnably provided in a longitudinal direction of the body frame 1. A pair of left and right drive wheels 11 is provided in the vicinity of the front end of the body frame 1. The drive wheels 11 are fixed to the lower projecting portion 1b of the body frame 1 movably upward and downward.

The universal wheel 12 is a small wheel directed to a movement direction at all times when the cart travels. The universal wheel 12 turns by a frictional resistance with the road surface to steer the cart toward a movement direction. The universal wheel 12 is fixed to the lower projecting portion 1b of the body frame 1 movably upward and downward.

The conveyance cart 100 includes four subsidiary frames 4 movable upward and downward against the body frame 1 and a suspension unit 20 that suspends the driving wheels 11 and the universal wheels 12 from the subsidiary frame 4.

Four subsidiary frames 4 are provided for a pair of drive wheels 11 and a pair of universal wheels 12. Two subsidiary frames 4 are arranged in each of the left and right sides of the body frame 1. The drive wheel 11 or the universal wheel 12 is rotatably fixed to the lower surface of each subsidiary frame 4.

The suspension unit 20 includes four suspension arms 22 for supporting the left and right subsidiary frames 4 of the body frame 1 movably upward and downward and spring dampers 23 provided between the body frame 1 and the left and right subsidiary frames 4.

Four suspension arms 22 are provided for a single subsidiary frame 4. Both ends of each suspension arm 22 are connected to the body frame 1 and the left and right subsidiary frames 4 pivotably around a horizontal axis, so that the suspension arm 22 serves as a parallel link mechanism that supports the subsidiary frame 4 against the body frame 1 to allow for parallel displacement.

As a result, even when the subsidiary frame 4 is lifted or lowered against the body frame 1, a posture of the subsidiary frame 4 does not change, and a positional relationship (alignment) between the drive wheel 11 and the universal wheel 12 is maintained constantly. Therefore, even when the subsidiary frame 4 is lifted or lowered, it is possible to suppress one of the drive wheel 11 and the universal wheel 12 from floating from the road surface.

The spring damper 23 absorbs or dampens vertical vibration in the drive wheel 11 and the universal wheel 12 caused by an unprepared road surface or the like and suppresses the vibration from the road surface from being transmitted to the body frame 1. The spring damper 23 has a coil spring 23a and a damper 23b. The spring damper 23 expands or contracts as the subsidiary frame 4 is lifted or lowered.

The coil spring 23a supports a load applied to the subsidiary frame 4 by virtue of its spring force. The coil spring 23a expands or contracts as the subsidiary frame 4 is lifted or lowered.

A hydraulic fluid filled in the damper 23b passes through a damping valve (not illustrated) as the coil spring 23a expands or contracts, so that the damper 23b generates a damping force for suppressing vibration of the subsidiary frame 4.

It is noted that a configuration of the suspension unit 20 is not limited to that described above, but other configurations may be possible if a posture of the subsidiary frame 4 against the body frame 1 is maintained.

The conveyance cart 100 includes: a torque sensor 6 serving as a pair of torque detection parts for detecting a driving torque applied to each of the left and right portions of the body frame 1 as the control handle 5 is pushed and handled; a controller 30 that computes the assisting force applied to the drive wheel 11 depending on a driving torque detected by the torque sensor 6; a pair of electric motors 15 for applying an assisting force computed by the controller 30 to each drive wheel 11; a pair of brakes 16 that brakes rotation of each drive wheel 11; and a console 29 provided with various switches that can be manipulated by an operator.

The torque sensor 6 is electrically connected to the controller 30 and outputs an electric signal corresponding to the detected driving torque to the controller 30. The torque sensor 6 includes: a torsion bar (not illustrated) connected between the control handle 5 and the body frame 1 and twisted by the driving force input from the handling portion while the driving force is transmitted to the body frame 1; and a potentiometer (not illustrated) that outputs an electric signal corresponding to the torsion of the torsion bar. The torque sensor 6 detects the driving torque based on the torsion of the torsion bar. By changing the torsion bar provided in the torque sensor 6, it may also be possible to change a handling sense of an operator depending on a live load of the cart without changing other members.

Figure 3:
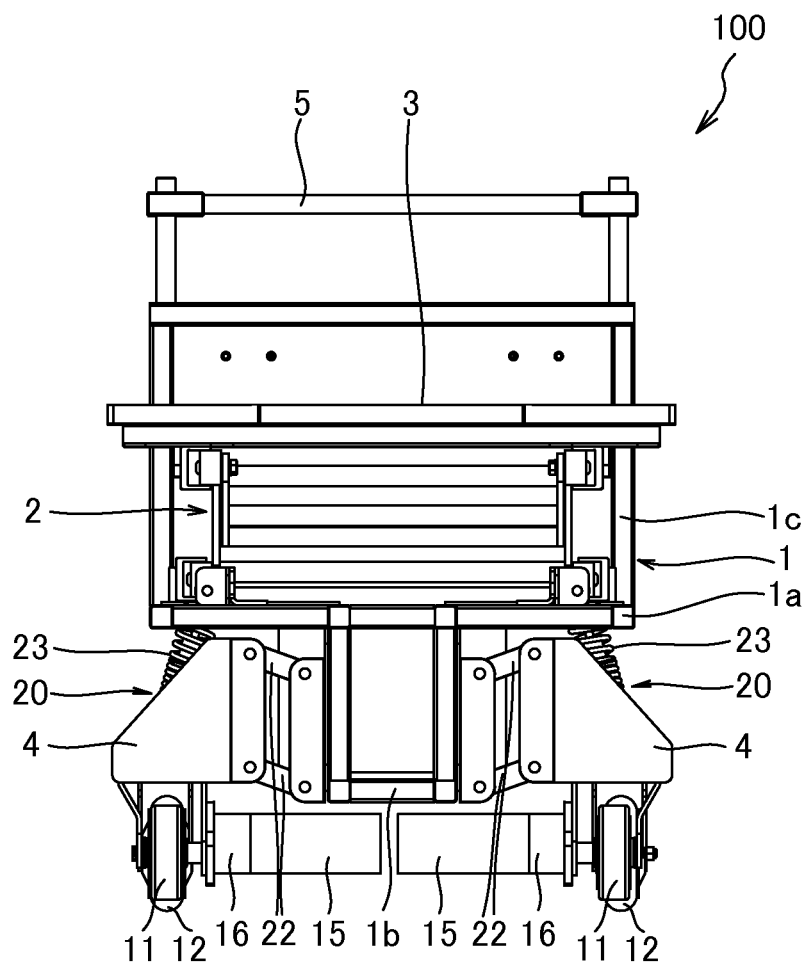
FIG. 3 is a front view of FIG. 1.

The electric motor 15 is electrically connected to the controller 30 and is rotated depending on the electric signal input from the controller 30. As illustrated in FIG. 3, the electric motor 15 is arranged inside the drive wheel 11 to apply an assisting force to the drive wheel 11. The left and right electric motors 15 are coaxially provided and arranged in series between a pair of the drive wheels 11. The electric motor 15 has a transmission (not illustrated) that transmits rotation to the drive wheel 11 by decelerating the rotation.

The brake 16 is arranged between an output shaft of the electric motor 15 and the drive wheel 11. The brake 16 has a brake solenoid 16a (refer to FIG. 4) that can switch between a braking state and an unbraking state. When the brake 16 switches to the braking state, the brake 16 fixes the drive wheel 11 to a rotation disable state.

The brake solenoid 16a is electrically connected to the controller 30 and switches depending on a predetermined electric current supplied in response to an instruction from the controller 30. While no predetermined electric current flows to the brake solenoid 16a, the brake 16 maintains the drive wheel 11 in the braking state. Meanwhile, when an electric current flows to the brake solenoid 16a, the brake 16 switches the drive wheel 11 to the unbraking state.

The controller 30 is mounted on the body frame 1 along with a power supply (not illustrated) or other electronic devices (not illustrated). The controller 30 performs control of the conveyance cart 100 and is a microcomputer having a central processing unit (CPU), a read-only memory (ROM), a random access memory (RAM), and an input/output (I/O) interface. The RAM stores data for the processing of the CPU, and the ROM stores a control program or the like of the CPU in advance. The I/O interface is used to input or output information from/to a connected device. Control of the conveyance cart 100 is implemented by operating the CPU or the RAM based on the program stored in the ROM.

The controller 30 is operated based on the power supplied from the power supply. When a voltage of the power supply abruptly decreases, the controller 30 stops overall control and sets the CPU to a sleep state. Assuming that a battery of 24 V is used as the power supply, the CPU is set to the sleep state, for example, when the voltage drops to, approximately, 18 V. As a result, it is possible to protect the controller 30 from an abrupt drop of the voltage of the power supply.

The controller 30 performs control such that the assisting forces for the left and right electric motors 15 are generated depending on the driving torque detected by the left and right torque sensors 6 in order to the move the conveyance cart 100 forward or backward and apply an assisting force in a straight movement, a turning movement, and a curve movement.

The controller 30 drives the electric motor 15 and the electric lift cylinder 2a on a pulse width modulation (PWM) control basis. The controller 30 has a pair of electric current detection parts 15a for detecting an electric current value flowing through the left and right electric motors 15 in practice. As a result, it is possible to perform a feedback control for the electric motor 15.

Figure 4:
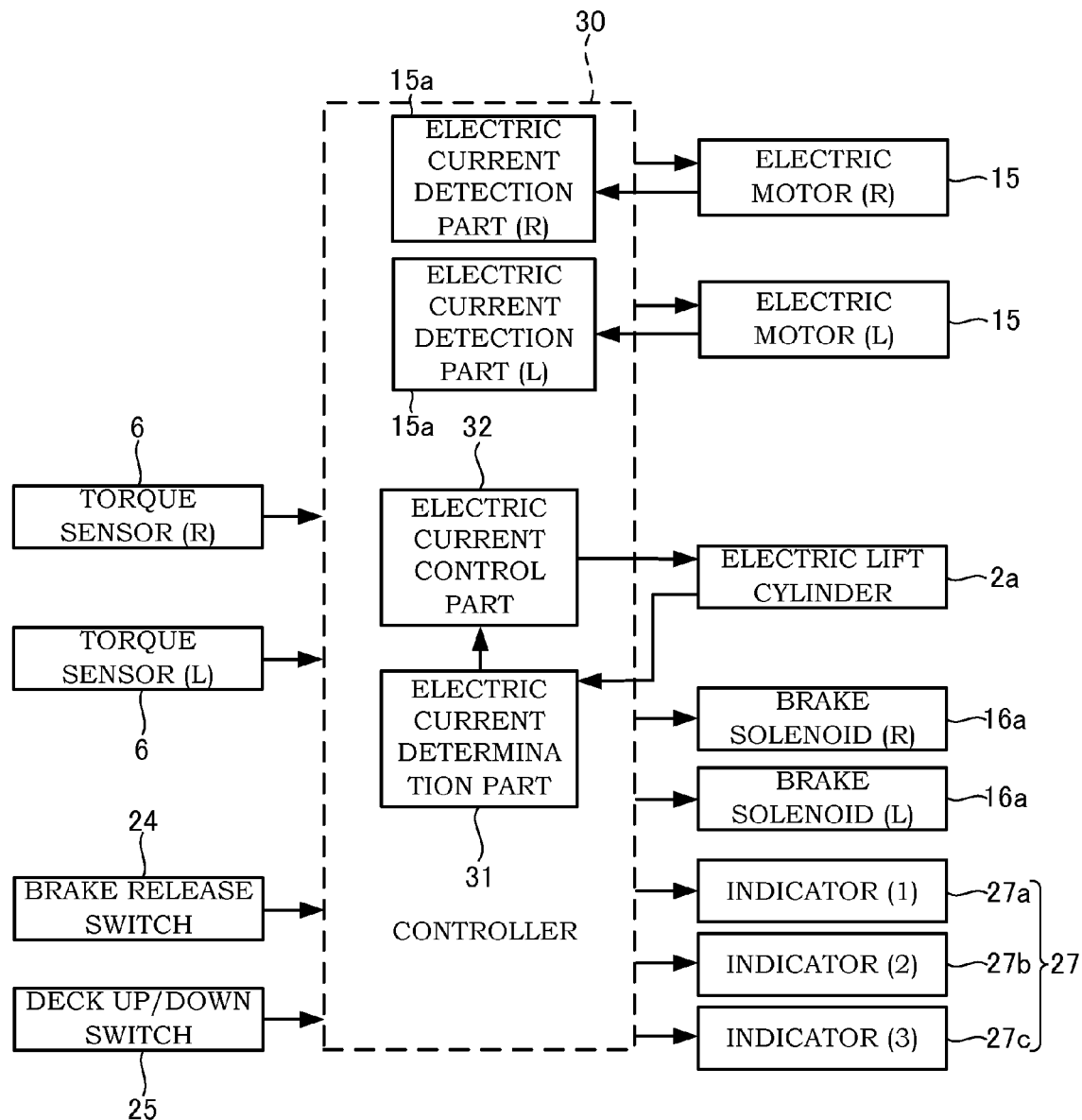
FIG. 4 is a control block diagram of the conveyance cart.

As illustrated in FIG. 4, the controller 30 has an electric current determination part 31 that determines a magnitude of the electric current flowing to the electric lift cylinder 2a and a time (continuous time) for flowing the electric current and an electric current control part 32 that stops or restricts supply of the electric current to the electric lift cylinder 2a based on the determination of the electric current determination part 31.

The console 29 is arranged on the rear face of the erected portion 1c of the body frame 1 as illustrated in FIG. 1. The console 29 is electrically connected to the controller 30. The position of the console 29 is not particularly limited if the console 29 is provided in a position where an operator can manipulate and see it. The console 29 includes: a brake release switch 24 for switching the brake solenoid 16a; a deck up/down switch 25 for controlling the electric lift cylinder 2a; and an indicator 27 that can display various failure modes.

The brake release switch 24 is a switch capable of switching the brake solenoid 16a based on an operator's manipulation. As an operator manipulates the brake release switch 24, a predetermined electric current flows to the brake solenoid 16a, and the drive wheel 11 switches to an unbraking state. As a result, the conveyance cart 100 can travel.

The deck up/down switch 25 is a switch for operating the electric lift cylinder 2a based on an operator's manipulation. As an operator manipulates the deck up/down switch 25, the controller 30 instructs a driving electric current to flow to the electric lift cylinder 2a so that the electric lift cylinder 2a expands or contracts. As a result, the deck 3 is lifted or lowered against the body frame 1.

The indicator 27 indicates a state that a part of the functions stop in order to allow an operator to recognize it for a fail-safe capability in the conveyance cart 100. The indicator 27 includes a first indicator 27a, a second indicator 27b, and a third indicator 27c.

The first indicator 27a indicates the most insignificant failure mode. The first indicator 27a is turned on when the maximum value of the electric current supplied to the electric motor 15 is restricted. A state that the first indicator 27a is turned on is a first failure mode.

The second indicator 27b indicates the less insignificant failure mode than that of the first indicator 27a. The second indicator 27b is turned on when supply of the electric current to the electric motor 15 stops, or supply of the electric current to the electric lift cylinder 2a stops. A state that the second indicator 27b is turned on is a second failure mode.

The third indicator 27c indicates the most significant failure mode. The third indicator 27c is turned on when overall functions of the conveyance cart 100 stop. That is, while the third indicator 27c is turned on, supply of the electric current to the electric motor 15 and the electric lift cylinder 2a stops, and supply of the electric current to the brake solenoid 16a stops in the conveyance cart 100. Therefore, the brake 16 switches to the braking state. A state that the third indicator 27c is turned on is a third failure mode.

Each of the first to the third failure modes is set only when the conveyance cart 100 does not enter any failure mode, and a capacity of the power supply remains such that overall functions of the conveyance cart 100 can be controlled. In addition, each failure mode is released by cutting off the power of the conveyance cart 100 once and reactivating it.

Next, a driving operation of the conveyance cart 100 will be described.

When an operator pushes the control handle 5 with both hands in parallel, the conveyance cart 100 moves forward straightly. In this case, the driving force input to the body frame 1 by pushing the control handle 5 is approximately equal between the left and right sides of the control handle 5. Therefore, the driving torques detected by left and right torque sensors 6 are also approximately equal to each other.

If the left and right torque sensors 6 detect an equal driving torque, the controller 30 instructs that the assisting force is equally applied to the left and right driving wheels 11 from the left and right electric motors 15. As a result, the assisting force is equally applied to the left and right drive wheels 11.

Therefore, the conveyance cart 100 moves forward straightly by virtue of the assisting force of the electric motor 15 in addition to the driving force applied by an operator.

It is noted that, when the conveyance cart 100 moves backward straightly, the pushing direction of the control handle 5 and the rotation direction of the electric motor 15 are reversed, and other actions are similar to those of the case where the conveyance cart 100 moves forward straightly.

Meanwhile, when an operator applies the pushing force to the control handle 5 differently between the left and right sides, the conveyance cart 100 turns left or right. In this case, the assisting force is differently applied to the left and right drive wheels 11 from the left and right electric motors 15.

Specifically, for example, when the conveyance cart 100 turns left, the pushing force applied to the control handle 5 by a right hand of an operator is stronger than the pushing force applied to the control handle 5 by a left hand of an operator. Therefore, the driving torque detected by the right torque sensor 6 is higher than the driving torque detected by the left torque sensor 6.

As a result, the controller 30 instructs that the assisting force applied from the right electric motor 15 to the drive wheel 11 is stronger than the assisting force applied from the left electric motor 15 to the drive wheel 11. As a result, the assisting force applied to the right drive wheel 11 becomes relatively stronger than the assisting force applied to the left drive wheel 11.

It is noted that the magnitude of the assisting force can be controlled depending on the pushing force applied by an operator to the control handle 5 because the left and right torque sensors 6 can detect the driving torque steplessly.

Next, a fail-safe operation in the conveyance cart 100 will be described with reference to FIG. 5.

In step 5101, the controller 30 reads a magnitude of the electric current supplied to the electric lift cylinder 2a.

In steps S102 to S104, a part of the functions of the conveyance cart 100 stops when an electric current excessively flows to the electric lift cylinder 2a over a normal use range due to, for example, a short-circuiting and the like.

In step S 102, the electric current determination part 31 determines whether or not an electric current having a magnitude equal to or larger than a first setting value flows to the electric lift cylinder 2a. In this case, the first setting value is set to be larger than the maximum value of the electric current supplied in a normal use. That is, the first setting value is set to an electric current value when an excessive electric current that does not flow in a normal use flows. For example, the first setting value is set to 30 [A] when the electric current supplied to the electric lift cylinder 2a in a normal use is set to 0 to 21 [A].

If it is determined in step S102 that the electric current value supplied to the electric lift cylinder 2a is equal to or larger than the first setting value, the process advances to step S103. Meanwhile, if it is determined in step S102 that the electric current value supplied to the electric lift cylinder 2a is smaller than the first setting value, the process advances to step S105.

In step S 103, the electric current determination part 31 determines whether or not the electric current equal to or larger than the first setting value determined in step S102 continuously flows for a first setting time. In this case, the first setting time is set to an interval for which a rush current which is a large electric current instantaneously flowing at the time of starting is not erroneously detected. In addition, since the first setting time is a time for which an excessive electric current having a magnitude that does not flow in a normal use flows, the first setting time is set to a very short time in order to protect the electric lift cylinder 2a or the controller 30. For example, the first setting time is set to 50 [ms].

If it is determined in step S103 that the electric current equal to or larger than the first setting value continuously flows for the first setting time or longer, the process advances to step S104, and the second failure mode is executed.

In step S104, the electric current control part 32 stops supply of the electric current to the electric lift cylinder 2a. Therefore, the expansion or contraction of the electric lift cylinder 2a stops, and the lifting or lowering of the deck 3 stops.

As a result, it is possible to protect the electric lift cylinder 2a or the controller 30 when an excessive electric current having a magnitude that does not flow in a normal use flows. In addition, by turning on the second indicator 27b, it is possible to notify an operator of a fact that the conveyance cart 100 has the second failure mode. Therefore, it is possible to improve reliability of the lift unit 2 of the conveyance cart 100.

Meanwhile, if it is determined in step S103 that the continuous time for which the electric current equal to or larger than the first setting value continuously flows is shorter than the first setting time, the process advances to step S105.

In step S105, it is determined whether or not the deck up/down switch 25 is manipulated by an operator. That is, the determination of steps S102 and S103 described above is performed at all times regardless of whether or not the deck up/down switch 25 is manipulated.

If it is determined in step S105 that the deck up/down switch 25 is manipulated, the process advances to step S106. Meanwhile, if it is determined in step S105 that the deck up/down switch 25 is not manipulated, the process returns.

In steps S106 and S107, a part of the functions of the conveyance cart 100 stops when the continuous driving time of the electric lift cylinder 2a is equal to or longer than a predetermined time.

In step S106, the electric current determination part 31 determines whether or not an electric current having a range supplied in a normal use continuously flows to the electric lift cylinder 2a for equal to or longer than a predetermined time. In this case, the predetermined time is set to be longer than the time taken for the electric lift cylinder 2a to lift the deck 3 from the lowering limit to the lifting limit.

If it is determined in step S106 that the continuous time for which an electric current having a range supplied in a normal use flows is equal to or longer than the predetermined time, the process advances to step S107.

In step S107, the electric current control part 32 stops supply of the electric current to the electric lift cylinder 2a. Therefore, the expansion or contraction of the electric lift cylinder 2a stops, and the lifting or lowering of the deck 3 stops.

Here, in a conveyance cart of the related art, in some cases, the deck may remain in a non-working state without being lifted even when the electric lift cylinder is driven in order to lift the deck while a burden having a weight over a maximum payload is loaded. For this reason, the electric lift cylinder may suffer from an overload state, and reliability of the lift unit of the conveyance cart may be degraded.

In this regard, in the conveyance cart 100, supply of the electric current to the electric lift cylinder 2a stops when the continuous driving time of the electric lift cylinder 2a is equal to or longer than a predetermined time. Therefore, it is possible to prevent an electric current from being continuously supplied to the electric lift cylinder 2a without any restriction when the deck 3 is not lifted even by driving the electric lift cylinder 2a while a burden having a weight over the maximum payload is loaded. Therefore, it is possible to improve reliability of the lift unit 2 of the conveyance cart 100.

It is noted that, when the supply of the electric current to the electric lift cylinder 2a stops in step S107, the electric lift cylinder 2a can expand or contract by manipulating the deck up/down switch 25 again unlike the second failure mode.

Meanwhile, if it is determined in step S106 that the continuous time for which the maximum value of the electric current supplied in a normal use continuously flows is shorter than the predetermined time, the process advances to step S108.

In steps S108 to S110, a part of the functions of the conveyance cart 100 stop when an electric current is not supplied to the electric lift cylinder 2a as instructed from the controller 30 due to, for example, a disconnecting or the like while the deck up/down switch 25 is manipulated.

In step S108, the electric current determination part 31 determines whether or not an electric current having a magnitude equal to or smaller than a second setting value is supplied to the electric lift cylinder 2a. In this case, the second setting value is set to be smaller than the minimum value of the electric current supplied when the deck up/down switch 25 is manipulated in a normal use. For example, the second setting value is set to 3 [A].

If it is determined in step S108 that the electric current value supplied to the electric lift cylinder 2a is equal to or smaller than the second setting value, the process advances to step S110. Meanwhile, if it is determined in step S108 that the electric current value supplied to the electric lift cylinder 2a is larger than the second setting value, the process returns.

In step S109, the electric current determination part 31 determines whether or not the electric current equal to or smaller than the second setting value determined in step S108 continuously flows for a second setting time. In this case, the second setting time is set to be longer than the first setting time. For example, the second setting time is set to 1 [s].

If it is determined in step S109 that the continuous time for which the electric current equal to or smaller than the second setting value flows is equal to or longer than the second setting time, the process advances to step S110, and the second failure mode is executed.

In step S110, similar to step S104, the electric current control part 32 stops supply of the electric current to the electric lift cylinder 2a. Therefore, the expansion or contraction of the electric lift cylinder 2a stops, and the lifting or lowering of the deck 3 stops.

As a result, the supply of the electric current to the electric lift cylinder 2a stops when an electric current is not supplied to the electric lift cylinder 2a as instructed from the controller 30 due to, for example, a disconnecting or the like while the deck up/down switch 25 is manipulated. In addition, by turning on the second indicator 27b, it is possible to notify an operator of a fact that the conveyance cart has the second failure mode. Therefore, it is possible to improve reliability of the lift unit 2 of the conveyance cart 100.

Meanwhile, if it is determined in step S109 that the continuous time for which the electric current equal to or smaller than the second setting value continuously flows is shorter than the second setting time, the process returns.

According to the embodiment described above, it is possible to obtain the following effects.

When the continuous driving time of the electric lift cylinder 2a exceeds a predetermined time, the supply of the electric current to the electric lift cylinder 2a stops. Therefore, it is possible to prevent an electric current from being continuously supplied to the electric lift cylinder 2a without any restriction when the deck 3 is not lifted even by driving the electric lift cylinder 2a while a burden having a weight over the maximum payload is loaded. Therefore, it is possible to improve reliability of the lift unit 2 of the conveyance cart 100.

Embodiments of this invention were described above, but the above embodiments are merely examples of applications of this invention, and the technical scope of this invention is not limited to the specific constitutions of the above embodiments.

Figure 5:
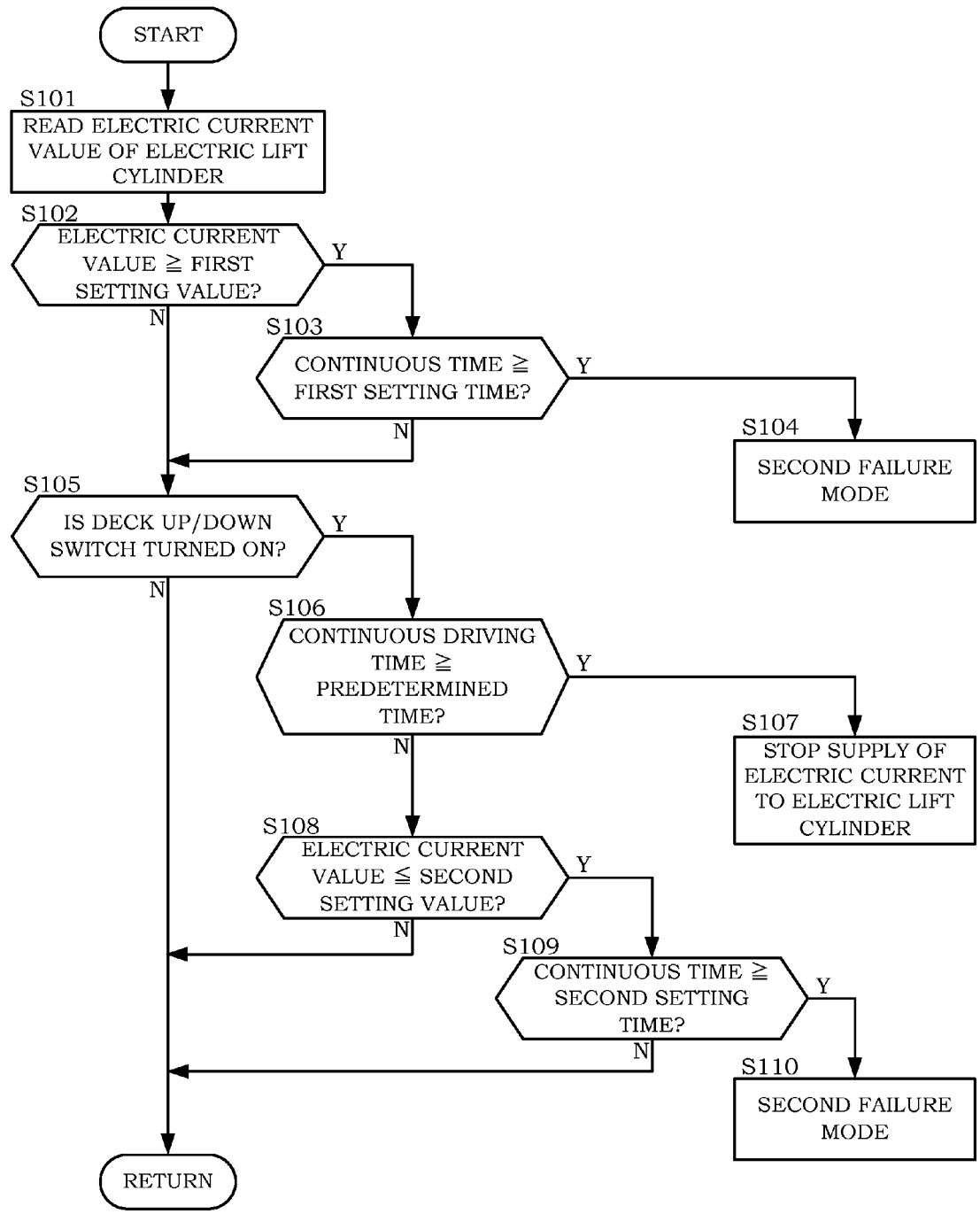
FIG. 5 is a flowchart illustrating a fail-safe operation of the conveyance cart.

For example, in the flowchart of FIG. 5, a control for detecting three different failure states and determining a corresponding failure mode is performed through a single flow. Alternatively, a control for detecting every single failure state may be performed through an independent flow, and a flow of determining a failure mode when there is a detection result that there is a failure state in each detection result may be further provided.

This application claims priority based on Japanese Patent Application No. 2011-225977 filed with the Japan Patent Office on Oct. 13, 2011, the entire contents of which are incorporated into this specification.

The embodiments of this invention in which an exclusive property or privilege is claimed are defined as follows:

1. A conveyance cart configured to convey a loaded burden, the conveyance cart comprising:
   a body frame supported by a wheel;
   a deck provided liftably against the body frame to load a burden;
   an electric actuator electrically driven to expand or contract to lift or lower the deck; and
   a controller that is configured to supply an electric current to the electric actuator,
   wherein the controller stops supply of an electric current to the electric actuator when a continuous driving time of the electric actuator is equal to or longer than a predetermined time, and
   the controller includes
      an electric current determination part that is configured to determine whether or not an electric current having a range supplied in a normal use continuously flows to the electric actuator for the predetermined time or longer, and
      an electric current control part that is configured to stop supply of an electric current to the electric actuator based on the determination of the electric current determination part.

2. The conveyance cart according to claim 1, wherein the predetermined time is set to be longer than a time taken for the electric actuator to lift the deck from a lowering limit to a lifting limit.

3. The conveyance cart according to claim 1, wherein the electric current control part stops supply of the electric current to the electric actuator when an electric current equal to or larger than a first setting value continuously flows to the electric actuator for a first setting time, the first setting value being larger than a maximum value of the electric current supplied in a normal use.

4. The conveyance cart according to claim 3, further comprising:
   a deck up/down switch manipulated by an operator to instruct the controller to supply a driving electric current to the electric actuator,
   wherein the electric current control part stops supply of the electric current to the electric actuator when an electric current equal to or smaller than a second setting value continuously flows to the electric actuator for a second setting time while the deck up/down switch is manipulated, the second setting value being smaller than a minimum value of the electric current supplied in a normal use.

* * * * *